United States Patent [19]

Cavill et al.

[11] Patent Number: 4,460,968
[45] Date of Patent: Jul. 17, 1984

[54] PRINT HEAD MOTOR CONTROL WITH STOP DISTANCE COMPENSATION

[75] Inventors: Barry R. Cavill; David F. Dodgen, both of Boca Raton, Fla.

[73] Assignee: International Business Machines Corporation, Armonk, N.Y.

[21] Appl. No.: 312,056

[22] Filed: Oct. 16, 1981

[51] Int. Cl.³ .............................................. G06F 15/46
[52] U.S. Cl. .................................... 364/519; 318/561; 318/632; 364/167; 364/176
[58] Field of Search ............... 364/519, 400, 130, 167, 364/174, 183, 176; 400/279, 322; 318/341, 345 E, 561, 590, 591, 592, 594, 603, 604, 606, 607, 608, 615–618, 632

[56] References Cited

U.S. PATENT DOCUMENTS

| 3,950,685 | 4/1976 | Kramer | 318/561 |
| 4,146,922 | 3/1979 | Brown et al. | 364/118 |
| 4,147,967 | 4/1979 | Aiena | 318/341 |
| 4,226,546 | 10/1980 | Hoffman | 400/322 X |
| 4,277,191 | 7/1981 | Davis et al. | 364/174 X |
| 4,311,399 | 1/1982 | Wegryn et al. | 400/322 X |

Primary Examiner—Joseph F. Ruggiero
Attorney, Agent, or Firm—Walter J. Madden, Jr.

[57] ABSTRACT

A control system for a bidirectional printer having a print head carriage movable at different speeds on different printing lines provides for equal stopping distance in the margin at both high and low speed operation. This is accomplished by delaying the initiation of stopping carriage motion when printing at low speed so that the carriage travels farther into the margin and this distance is controlled so as to be equal to the travel distance at the end of a line printed at high speed.

5 Claims, 14 Drawing Figures

PRINT HEAD MOTOR CONTROL WITH STOP DISTANCE COMPENSATION

CROSS REFERENCE TO RELATED APPLICATION

Features disclosed but not claimed herein are claimed in copending application Ser. No. 312,055, filed Oct. 16, 1981 assigned to the same assignee as the present application.

BACKGROUND OF THE INVENTION

1. Field of the Invention

This invention relates to printer control systems and relates more particularly to such control systems for multi-velocity bidirectional printers in which the stopping distance of the print mechanism is controlled.

2. Description of the Prior Art

Some current bidirectional printers are controlled so that the print carriage can travel at one of a number of selected velocities for each line printed, depending upon the particular printing application being carried out. Such printers often are used in a closed loop servo system in which the command to stop is issued to the print mechanism drive prior to the time the print mechanism reaches the end of a line, in order to permit the system to decelerate the print mechanism at the proper point.

The distance traveled, once stopping is started, until zero velocity of the print mechanism is reached is dependent on the initial velocity. In such printers, the distance required to bring the print mechanism back up to the desired speed in the opposite direction after stopping is also determined by the velocity since the acceleration is constant. The difference in stopping distance (and also time) between the different speeds employed can cause a problem in some situations. For example, if a stop is done at low speed and the next start is to be at high speed, the distance traveled by the print mechanism into the margin at low speed is much less than the distance needed for the print mechanism to come up to the proper speed when leaving the margin at high speed. This would mean that the velocity when printing begins would be too slow and an error condition would result. Also, the time to go into and out of the margin at low speed would not be long enough to allow the paper forms on which printing is taking place to move and be in the proper polition for printing of the next line.

3. Prior Art

U.S. Pat. Nos. 4,146,922 and 4,147,967 disclose the use of microprocessors to control a print carriage. However, neither of these patents address the problem solved by the present invention.

SUMMARY OF THE INVENTION

In accordance with this invention, stopping is accomplished in a given distance for all printing speeds of the print mechanism. This is accomplished by providing a delay in issuing the stop command to the print drive mechanism when printing at low speed. Thus, the print drive mechanism drives the print mechanism further into the margin on a low speed printing cycle than it normally would, and this distance can be controlled so as to be equal to the distance for the print drive mechanism when printing in a high speed mode.

DESCRIPTION OF THE PREFERRED EMBODIMENT

Figure 1:
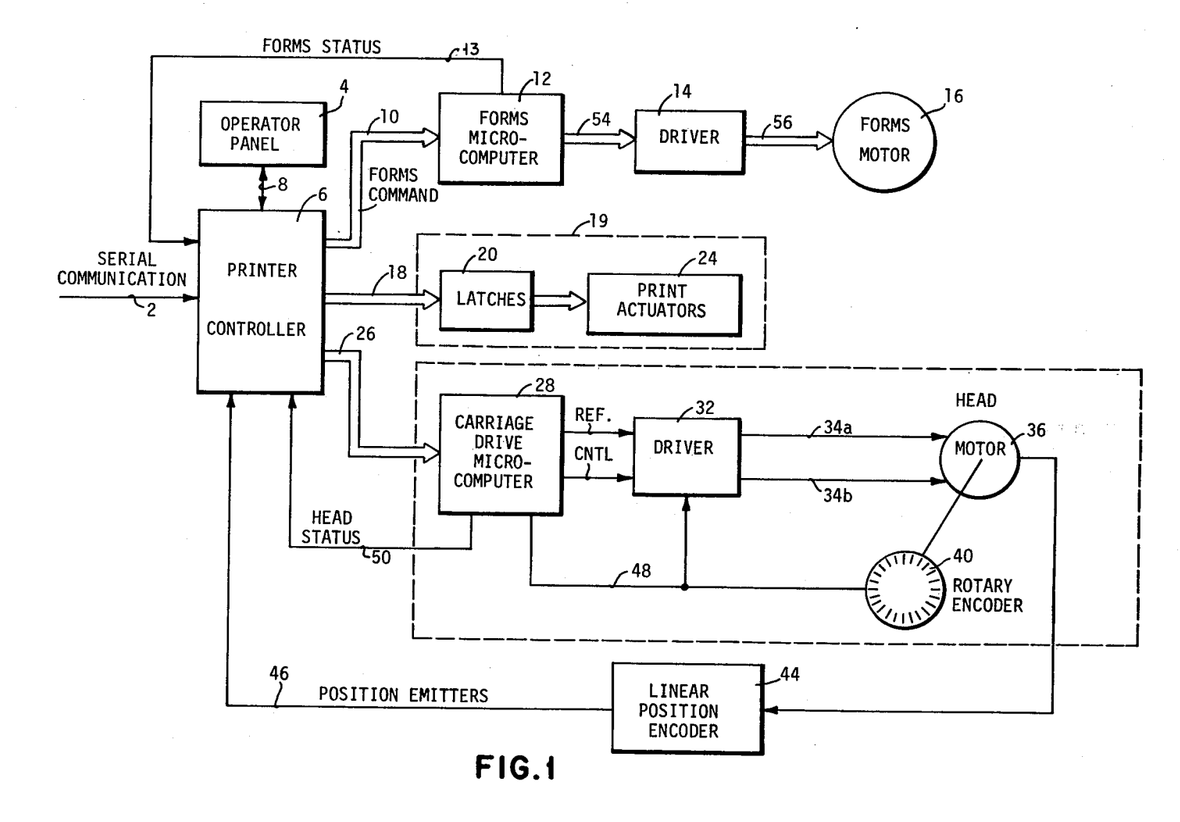
FIG. 1 is a diagram of the overall printer control system.

The present invention is used with a printer system shown in FIG. 1. This printer system receives commands via a serial communications link 2 which are decoded by the printer controller 6 and used in conjunction with status set by an operator panel 4 connected to controller 6 by a panel cable 8. Controller 6 may be of the type shown in copending application Ser. No. 086,484, filed Oct. 19, 1979, entitled "Printers Subsystem With Microprocessor Control," U.S. Pat. No. 4,452,136. The controller commands are supplied by way of command lines 10 to a forms microcomputer 12 in the form of a single chip microcomputer which supplies open loop drive commutation signals to a power driver 14. The power driver provides drive voltage to a forms stepper motor 16. The command to move is given to forms microcomputer 12 by way of command lines on command lines 10 from printer controller 6, and status is returned to the printer controller via the forms status lines 13.

The print actuator system 19 attached to the print head carriage includes actuator latches 20 and print actuators 24 and does the actual print image formation of the images formed by printer controller 6. The dot pattern to be printed is transmitted from controller 6 to latches 20, and then to actuators 24. The dot placement for the characters printed is determined by printer controller 6, based on information from a linear position encoder system attached to the print head carriage system.

Actuator carriage position is determined by a linear position encoder 44 which may include an optical detector attached to the carriage which is driven by the head motor system and a stationary optical grid attached to the printer frame, as is well known in the art. The carrier assembly is attached to the print head drive motor 36 by a timing belt and as the carrier moves, the attached optical detector moves across the grid and generates position emitter signals on a line 46 which are used by printer controller 6 to form characters.

The actuator carriage print head motor drive system 38 includes a carriage drive microcomputer 28 and a power driver 32 attached to brush DC head motor 36 by way of cables 34a, 34b. Attached to the shaft of head motor 36 is a rotary optical encoder 40 with 810 cycles per revolution. This encoder is used by carriage drive microcomputer 28 to obtain speed information. Instructions for controlling the print head motion are given to microcomputer 28 via command lines 26 and status is returned to printer controller 6 by means of status lines 50.

Figure 2:
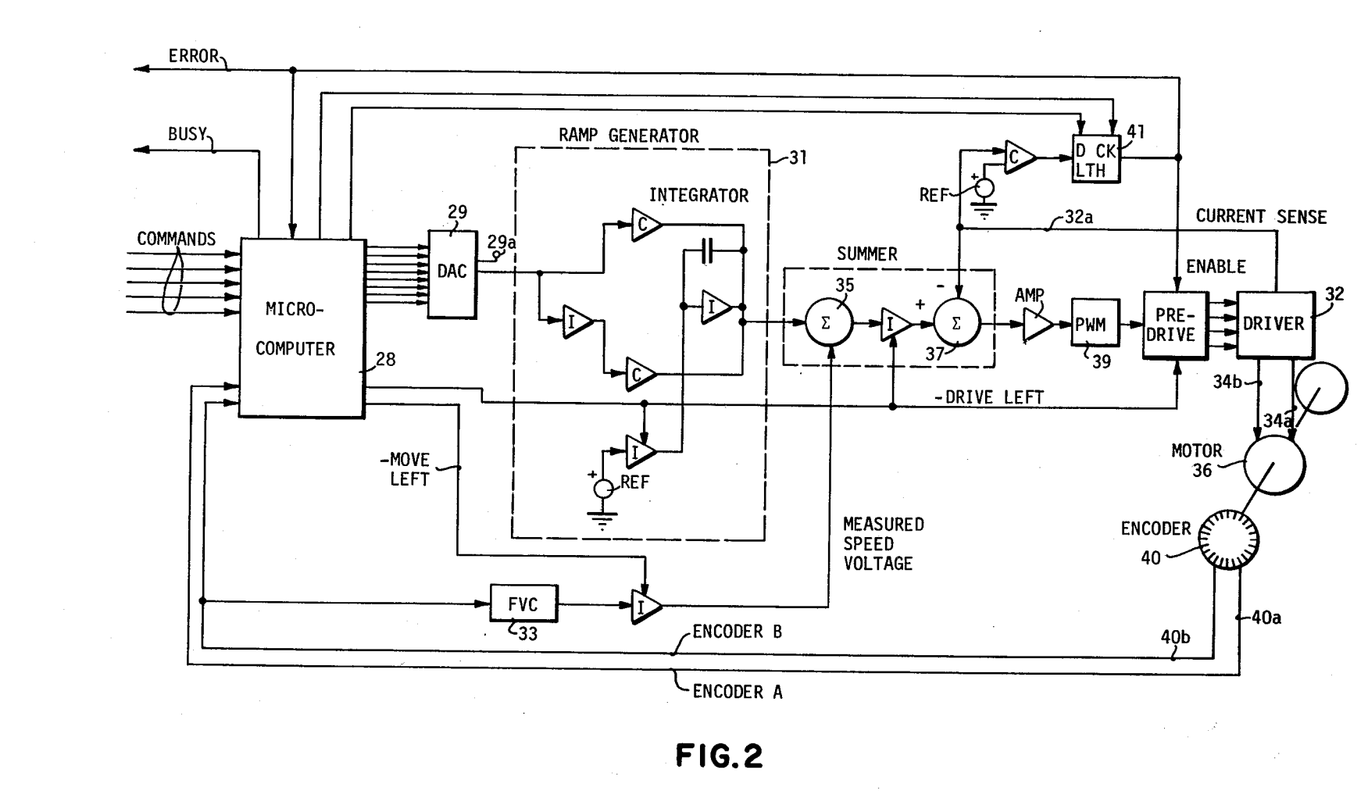
FIG. 2 is a diagram illustrating details of the printer carriage drive control system.

As shown in more detail in FIG. 2, microcomputer 28 is connected to a digital to analog converter (DAC) 29 and provides a reference speed count to the DAC which is translated to a voltage representing the desired head or carriage velocity. Microcomputer 28 also controls the drive direction of motor 36 (−Drive Left) and detects and provides actual direction of motion information (−Move Left) by testing the "A" and "B" encoder lines 40a, 40b. The DAC output is used by ramp generator circuitry 31 to develop a command voltage representing the desired velocity of motion. The frequency of changes in the "B" encoder signal on line 40b is translated to a voltage level by a frequency-to-voltage converter (FVC) module 33. This voltage, which represents the actual measured velocity, is compared with the desired voltage (speed) from ramp generator 31 in a summer 35. This error voltage difference (corrected for direction of drive) is combined with current feedback supplied on line 32a from driver 32 in a summer 37 to provide the drive signal to a pulse width modulator module 30 and amplifier. Pulse width modulator module 39 translates the input voltage to a constant period chopped DC voltage whose duty cycle determines the percentage of time that drive voltage is applied to motor 36. The current feedback signal on line 32a serves to limit motor current by decreasing drive when current levels are already high. If the motor currents become excessive, an overcurrent error is detected, latched, and the drive is disabled.

Figure 3:
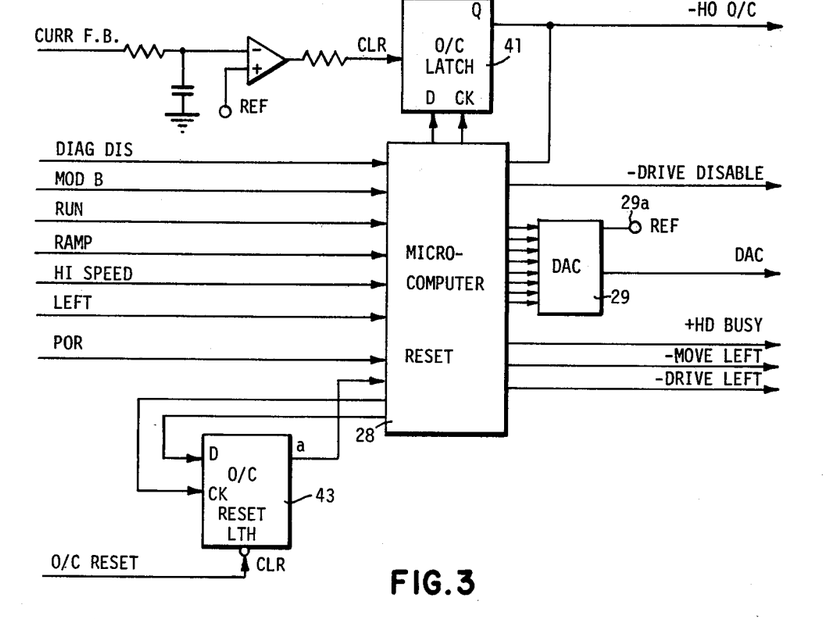
FIG. 3 is a diagram illustrating the inputs and outputs of the printer carriage drive control microcomputer.

Referring to FIG. 3, microcomputer 28 performs the command decode and overall motion control for the head carriage servo system. The input lines "−Run", "−Ramp", "−Hi Speed", "−Mod B", and "−Left" are decoded to provide the command outputs "DAC", "−Move Left" and "−Drive Left" and the status output "+HD Busy" and "−HD O/C". The inputs "−Run" or "−Ramp" initiate motion, with the input "−Left" indicating the motion direction desired and the inputs "−Mod B" and "−Hi Speed" determining the desired speed. Speed selection is accomplished by the microcomputer transmitting a count value to DAC 29. This count will cause the DAC to produce an output voltage which is a fraction of a reference voltage supplied from a terminal 29a. A large count value output from microcomputer 28 will cause a large portion of the reference voltage to be produced, indicating a higher desired final speed, and a small count to the DAC will result in a smaller voltage output and a lower speed.

The input "−Left" is used in combination to develop the drive direction of the motor (−Drive Left). The drive direction depends on the current action being taken (starting, stopping, etc.) and the two inputs. As mentioned above, the "A" and "B" encoder signals on lines 40a, 40b of FIG. 2 are developed by optical encoder 40 attached to the motor shaft. The encoders are symmetrical and phase shifted by 90 degrees such that the "A" encoder leads the "B" encoder when moving left and lags the "B" encoder when moving right. These signals are used by the microcomputer to develop the output "−Move Left" which indicates the actual direction of motion.

The motor current is sampled and compared against a reference level. If the measured current through the motor is excessive, a head overcurrent latch 41 is set and detected by the microcomputer. The overcurrent latch can also be set by the microcomputer directly. The overcurrent reset latch 43 is used to capture the overcurrent reset pulse 26h from the printer controller 6 sampled by the carriage drive microcomputer. This instructs microcomputer 28 to reset a head overcurrent latch (HD O/C Latch) 43.

Figure 4:
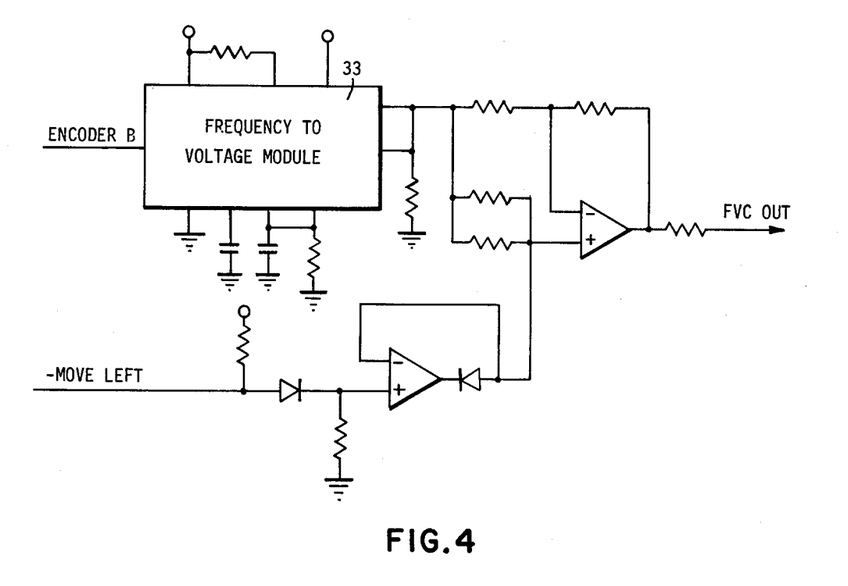
FIG. 4 shows the frequency-to-voltage converter used to generate a measure of the printer carriage velocity.

Motor motion velocity is detected by the frequency-to-voltage converter system 33 shown in FIG. 2 and illustrated in more detail in FIG. 4. The encoder "A" and "B" signals from encoder disk 40 are produced when alternating light and dark lines interrupt the light source to create pulses which vary in repetition rate as the motor speed varies. The frequency of pulses from encoder "B" is converted to a DC voltage by converter module 33. This voltage is then either inverted or not inverted by the circuitry of FIG. 4, depending on the level of the input line labelled "−Move Left". This provides a bipolar signal on "FVC Out" line which is sent to the summer and represents print head motor velocity.

Figure 5A:
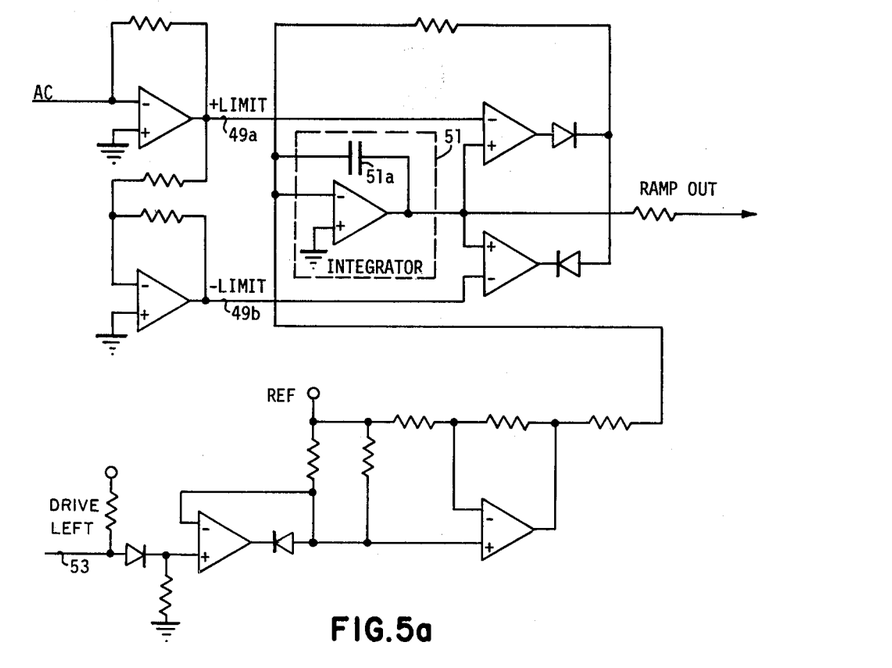
FIG. 5a shows the circuitry of the ramp generator used to generate the velocity reference voltage.
Figure 5B:
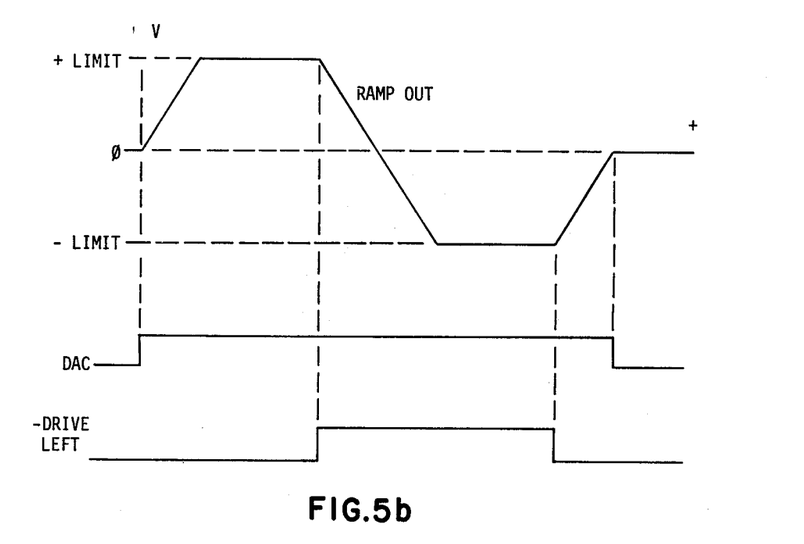
FIG. 5b shows timing relationships among various parameters of the control system.

The ramp generator circuitry is shown in FIG. 5a and timing relationships in this circuitry are shown in FIG. 5b. This circuitry provides the speed reference signal to be used in velocity control. As seen in FIG. 5b, the generator provides a linear velocity change during periods of acceleration and deceleration and then the velocity remains at a fixed value once full speed is reached. When the DAC voltage changes from zero volts as carriage motion begins, the DAC supplies a velocity reference voltage which sets the positive and negative limit voltages on the labelled lines 49a, 49b. The integrator 51 then begins to change (Ramp up) towards the limit voltage as its capacitor 51a is charged at a rate determined by a fixed reference. When the integrator output voltage reaches the final limit value established by the DAC voltage on lines 49a, 49b, the limit circuit is activated to hold capacitor 51a from further charging.

To change motor drive direction, begin slowing down, and finally stop or turn around, a velocity ramp is again generated. When stopping begins, the sign of the reference is inverted by appearance of the signal "−Drive Left" on line 5 to cause capacitor 51a to change polarity. If stopping at zero velocity is desired, the DAC value is set to zero once zero velocity is reached. If the motor is to be turned around without stopping, the DAC value is set to the desired velocity voltage value for motion in the opposite direction.

Figure 6:
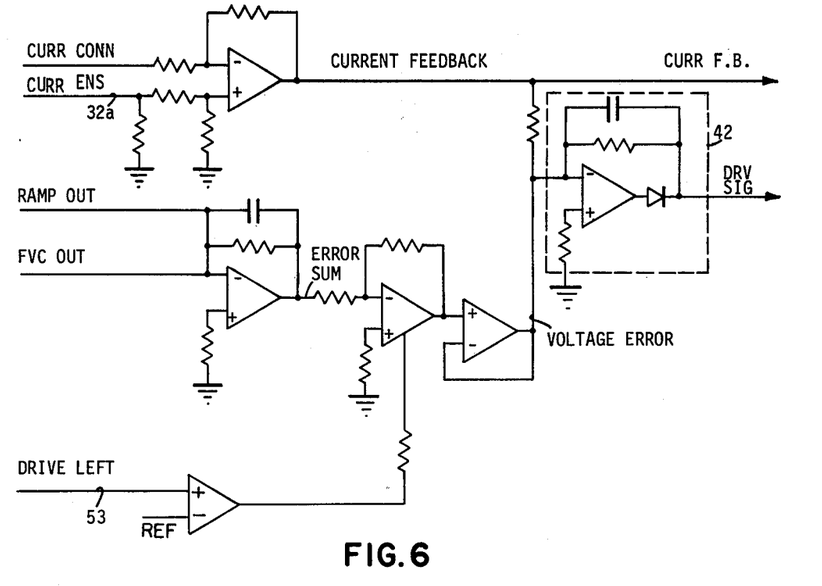
FIG. 6 illustrates the summing and amplifier portion of the control circuitry.

As shown in FIG. 6, the ramp circuitry output is summed with the output (FVC out) of frequency-to-voltage converter circuitry 33 to give an error sum signal. The polarity of this error sum is then corrected to give the proper feedback polarity, depending on the direction of motion with the line "−Drive Left" 53. This corrected signal is the "voltage error" signal which is used to determine the amount of drive applied to the motor. The current driving the motor is sensed through a resistor and this "current feedback" value is used to insure the motor currents do not become excessive. The "current feedback" signal is summed with the "voltage error" signal through a network 42 so that if a large current is going through the motor, the drive signal ("DRV SIG") amplifier output will not exceed the motor drive capabilities.

Figure 7:
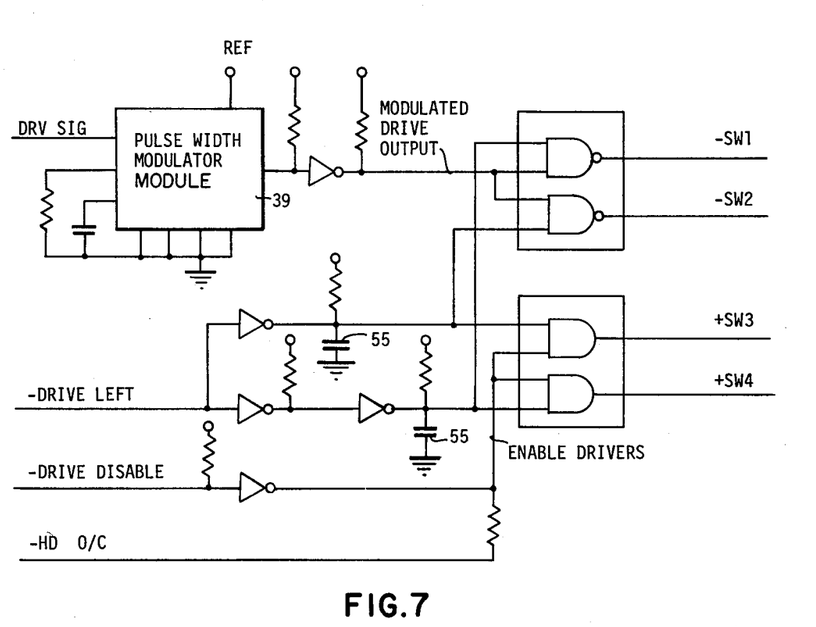
FIG. 7 shows the pulse width modulator circuitry used to control power to the carriage drive motor.

As seen in FIG. 7, the drive signal controls the duty cycle of the pulse width modulated circuitry 39. As the drive signal voltage increases, the percentage duty cycle on the "modulated drive" output increases. Bipolar drive to the motor is accomplished by activating two switch outputs at a time (SW1 and SW4 or SW2 and SW3) to provide power to the motor. The direction of drive (the switches selected) is controlled by the input "−Drive Left". Also, motor drive must be enabled (−DR Disable). If an overcurrent error is detected, then drive to the motors will be disabled using the line "−HD O/C".

Figure 8:
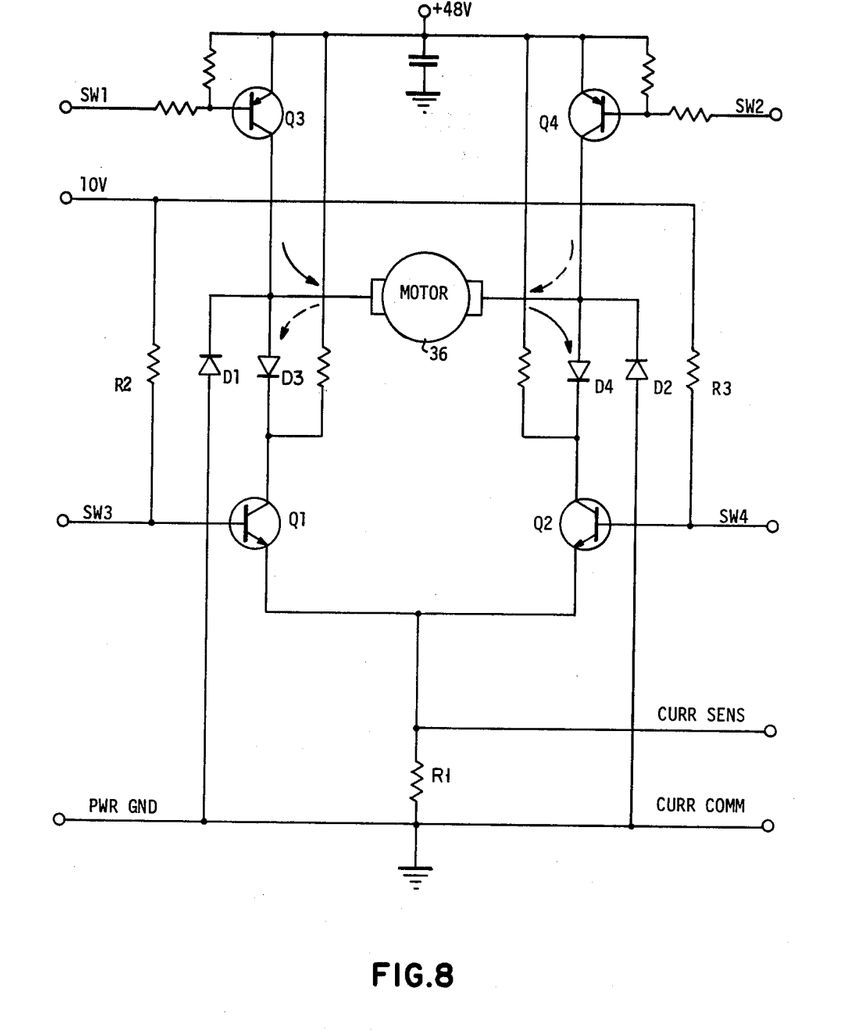
FIG. 8 shows the proper drive circuitry.

Referring to FIG. 8, the print head motor power drive is a standard H type switch configuration with a DC brush motor 36 as the cross member of the H. The motor is driven with bidirectional currents by appropriate selection of the switches. Transistors Q1, Q2, Q3, Q4 act as switches that are operated in pairs. To select one current direction, Q2 and Q3 are in saturation while Q1 and Q4 are off. To select the opposite current direction, Q2 and Q3 are off while Q1 and Q4 are on. To prevent transistors on the same leg from being turned on at the same time in switching, causing a short circuit condition, switching delay capacitors 55 are provided for this purpose located on the line "−Drive Left" in FIG. 7.

Diodes D1 and D2 provide a discharge path for the motor coil when either Q1 or Q2 are just switched off. Additionally, they provide a discharge path for motor back EMF currents when drive is removed (Q3 and Q4 off). Diodes D3 and D4 are fast switches (relative to Q1 and Q2) that prevent forward biasing of the collector-base junction when reverse voltages are generated by coil discharge. R1 is a low ohm resistor used for sensing coil current. R2 and R3 ensure transistor cutoff when the predriver is disconnected.

As discussed above, the distance traveled, once stopping is started, until zero velocity of the print mechanism is reached is dependent on the initial velocity. In such printers the distance required to bring the print mechanism back up to the desired speed in the opposite direction after stopping is also determined by the velocity since the acceleration is constant. The difference in stopping distance (and also time) between the different speeds employed can cause a problem in some situations. If a stop is done at low speed and the next start is to be at high speed, the distance traveled by the print mechanism into the margin at low speed is much less than the distance needed for the print mechanism to be up to full speed when leaving the margin at high speed. This would mean that the velocity when printing begins would be too slow, and an error condition would result. Also, the time to go into and out of the margin at low speed would not be long enough to allow the forms to move and be in the proper position for printing of the next line.

In the present system, prior to the beginning of printing, the time required to move a prescribed number of transitions of one encoder channel is measured. The number of encoder transitions to be measured is determined by the speed of the motor (4 speeds may be employed in this system). Once the microcomputer determines the motor is moving at full steady state speed, a timer is reset and transition counting begins. When the desired number of transitions have been counted, the timer is stopped. The measured time value is then compared with a desired time value which represents the desired speed (since the number of transitions required is different for each speed).

If the measured time is too far from the desired value (greater than 25% error), the system is deemed to be in error and is uncompensatable. If the difference is less than 25%, the difference is used to adjust the DAC reference value for the speed being tested. The time difference measured is scaled so that the difference at high speed can be added directly to a saved DAC value if the speed is too slow, or subtracted from the saved DAC value if the speed is too high. For low speed, the difference is divided by two (scaled) and then used to correct the saved DAC value. This correction method allows for immediate correction of large and small errors with no manual velocity adjustments required because the printer power-on diagnostics runs the carriage motor at each speed and direction before printing. This one motion at each speed and direction is sufficient to bring any speed error due to component tolerance, aging, friction differences, etc. into the desired range of ±2 percent so that printing may begin on the next motor cycle.

The corrected DAC value is not sent to the DAC as soon as the new average speed reference is calculated because a speed discontinuity would result. Therefore, the new DAC reference value is saved in a random access memory (RAM) in microcomputer 28 where it will be used the next time motion takes place at that speed and in that direction. The microcomputer saves a different reference value for each speed and direction. This is required for precise operation since different circuitry (and different tolerances) are used for motion in each direction. This compensation is performed continuously on each line printed to insure that no accumulated frictional or other error exists.

Figure 9A:
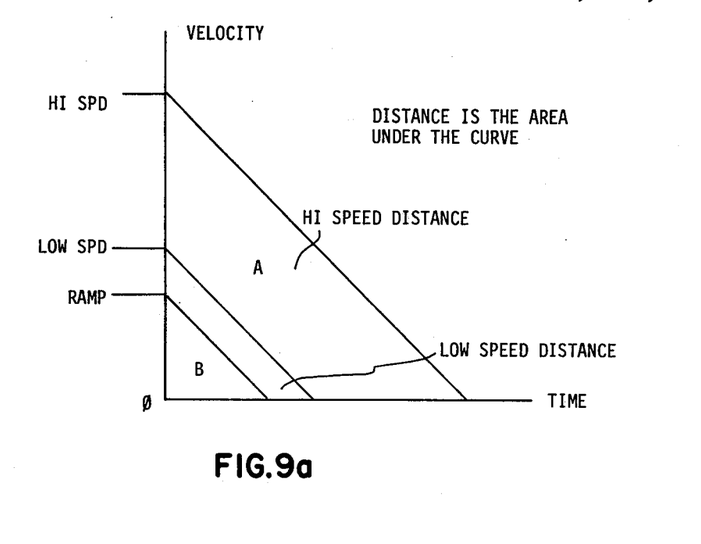
FIGS. 9a, 9b and 9c are graphs illustrating the control of the stopping distance.

The above described system can also perform stop distance compensation. The distance and time needed to stop the DC servo system depend on several factors. As the initial run velocity increases, stop distances increase, while stopping distance decreases with increasing acceleration of the drive system (increasing slope of ramp generator). Referring to FIG. 9a, the distance to stop at half of high speed is the area under curve B, while the distance required to stop at high speed is the area under curve A (equal to four times the distance for half speed). Also, the time to stop at high speed is twice the time to stop for half speed. It is desirable to have the stopping distances for all speeds equal to insure that changes in speed will not cause velocity errors when entering the print region because the motor was not up to full speed.

Figure 9B:
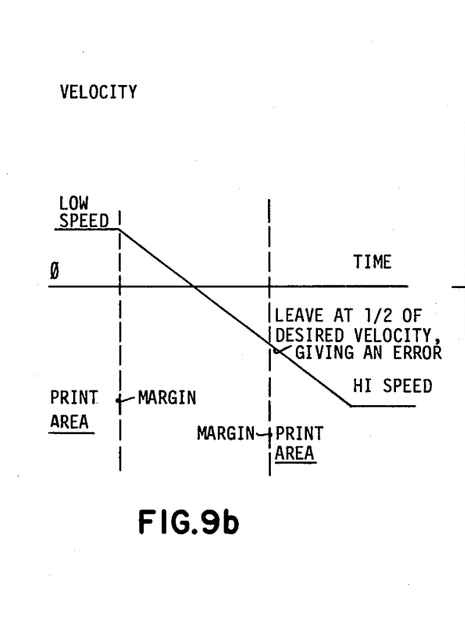
Figure 9C:
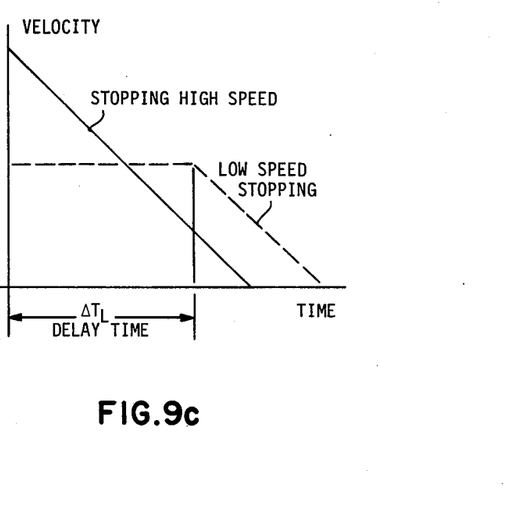

This is illustrated in the graph of FIG. 9b which is a plot of velocity versus time for the end of printing a line at low speed, followed by a reversal of the carriage to print the following line at high speed. When stopping after low speed operation without distance compensation the carriage does not travel as far into the margin as it does at the end of a high speed operation. This travel distance into the margin is not large enough to enable the carriage to reach the proper velocity by the time it returns to the print area. Hence, as shown in FIG. 9b, the carriage enters the print area at a velocity which may be only one half of that required for high speed printing, thereby resulting in the generation of an error indication. To insure the nominal stop distance is equal for both speeds, stopping at half speed is delayed by an amount $\Delta T_L$, with the heads moving an additional distance at nominal half speed such that the areas under each stopping curve for each speed are the same, as seen in FIG. 9c. The delay is measured by microprocessor 28 using the output from optical encoder 40, or by time measurement.

Figure 10A:
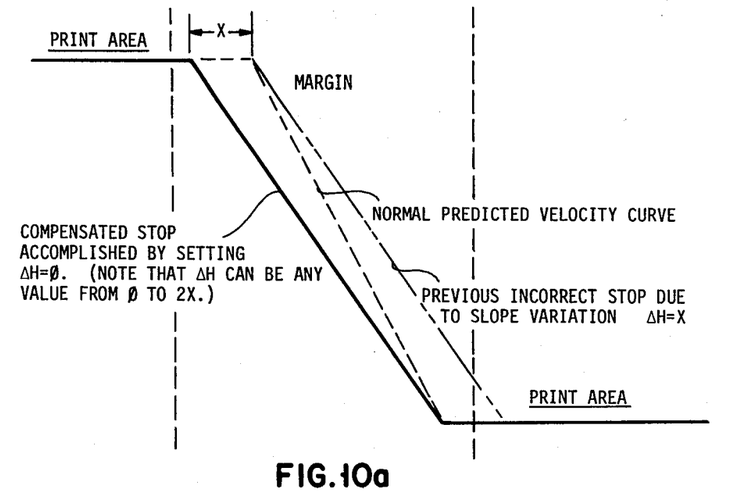
FIGS. 10a and 10b are graphs illustrating the compensation provided for incorrect carriage velocity curves.
Figure 10B:
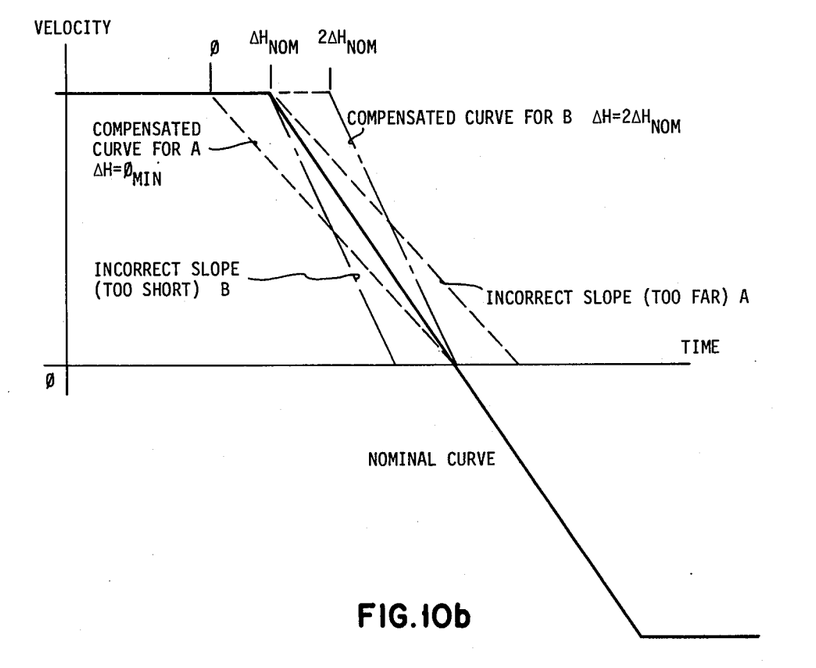

The actual stopping operation required to permit distance compensation may be slightly different than shown above in FIG. 9c, and is illustrated in the graphs of FIG. 10a. For all speeds, a nominal extra delay $X = \Delta H_{nom}$ of encoder transitions or time is added to each turn or stop sequence and the acceleration slope is slightly steeper. Variations in loading or in the slope of the velocity vs. time curve due to aging and component variations are compensated for by having the microcomputer monitor the distance traveled on each stop and changing the number of emitters traveled after detecting a stop command until the direction drive line is changed ($\Delta H$). If too many emitters were moved while stopping on the previous stop sequence in the same direction, subsequent stoppings in that direction will begin earlier ($\Delta H$ is smaller) to insure the same distance traveled. If the stop distance was too short, the stopping will be delayed ($\Delta H$ larger) to attain the desired stop distance. FIG. 10a illustrates this operation for a single incorrect stop and FIG. 10b shows compensation for two incorrect slopes.

We claim:

1. A control system for a printer having a bidirectional carriage carrying a print head,
   said carriage being controllable to print at different speeds on different lines, said printer printing on a medium having a central print area and margin areas on each side of said print area, said system including:

means for generating a command instructing said carriage to stop as it approaches an edge of said print area, means for measuring the distance traveled by said carriage after said stop command is issued for each line printed, and means responsive to said measured distance for compensating for any variation of said measured distance from a desired value by issuing said stop command at a different time on the subsequent line of printing.

2. Apparatus in accordance with claim 1 including:
   store means for storing a measure of any variation from the desired value for use in said compensating on said subsequent line of printing.

3. Apparatus in accordance with claim 2 in which said distance traveled is measured for each direction of printing, and separate values of said variation are stored in said store means for each direction of printing.

4. Apparatus in accordance with claim 3 including a microcomputer for measuring said distance traveled.

5. Apparatus in accordance with claim 3 in which said distance traveled is measured for each direction and speed of printing, and separate values of said variation are stored in said store means for each direction and speed of printing.

* * * * *

UNITED STATES PATENT AND TRADEMARK OFFICE
CERTIFICATE OF CORRECTION

PATENT NO. : 4,460,968
DATED : July 17, 1984
INVENTOR(S) : Barry R. Cavill; David F. Dodgen It is certified that error appears in the above-identified patent and that said Letters Patent are hereby corrected as shown below:

Column 2, line 20, "proper" should be --power--.

Signed and Sealed this

Twenty-seventh Day of November 1984

[SEAL]

Attest:

GERALD J. MOSSINGHOFF

Attesting Officer

Commissioner of Patents and Trademarks